(12) United States Patent
Wojcik et al.

(10) Patent No.: US 11,921,601 B1
(45) Date of Patent: Mar. 5, 2024

(54) DEVICE CONFIGURATION USING SENSITIVITY ANALYSIS

(71) Applicant: MOTOROLA SOLUTIONS, INC., Chicago, IL (US)

(72) Inventors: Leszek Wojcik, Cracow (PL); Grzegorz Chwierut, Cracow (PL); Pawel Pluszynski, Cracow (PL); Michal Janowski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/933,775

(22) Filed: Sep. 20, 2022

(51) Int. Cl.
| | |
|---|---|
| *G06F 11/30* | (2006.01) |
| *G06F 11/34* | (2006.01) |
| *G06N 20/00* | (2019.01) |
| *H04L 41/0803* | (2022.01) |
| *H04L 41/16* | (2022.01) |
| *H04L 67/00* | (2022.01) |

(52) U.S. Cl.
CPC ...... *G06F 11/3051* (2013.01); *G06F 11/3409* (2013.01); *G06N 20/00* (2019.01); *H04L 41/0803* (2013.01); *H04L 41/16* (2013.01); *H04L 67/34* (2013.01)

(58) Field of Classification Search
CPC . G06F 11/3051; G06F 11/3409; G06N 20/00; H04L 41/0803; H04L 41/16; H04L 67/34
See application file for complete search history.

(56) References Cited

U.S. PATENT DOCUMENTS

| | | | |
|---|---|---|---|
| 9,912,733 | B2 | 3/2018 | Ravi et al. |
| 10,228,931 | B2 | 3/2019 | Singh et al. |
| 10,405,116 | B2 | 9/2019 | Jarvis et al. |
| 2014/0195297 | A1 | 7/2014 | Abuelsaad et al. |
| 2021/0144228 | A1* | 5/2021 | Chastain ............... H04L 67/303 |
| 2022/0374221 | A1* | 11/2022 | Sayyed ................. G06F 21/572 |
| 2023/0195607 | A1* | 6/2023 | Sweeney ............. G06F 11/3692 |
| | | | 717/124 |

FOREIGN PATENT DOCUMENTS

CN 108446200 A * 8/2018 .......... G06F 11/3051

\* cited by examiner

*Primary Examiner* — Bryan Y Lee
(74) *Attorney, Agent, or Firm* — Michael Best & Friedrich LLP (57) ABSTRACT

Device configurations for a machine-learned model. A device analytics system includes an electronic processor configured to determine, for a machine-learned model configured to detect a plurality of features, a prioritization ranking for a plurality of input parameters provided to the machine-learned model and receive, for each device, a confidence value for each feature included in the plurality of features. The electronic processor is configured to determine, for each device included in the plurality of devices, a performance value for each feature included in the plurality of features based on the prioritization ranking for the plurality of input parameters and the confidence value for each feature for the respective device. The electronic processor is configured to select, based on the performance value for each device included in the plurality of devices for a feature, a device configuration for the machine-learned model, and implement the selected device configuration.

20 Claims, 7 Drawing Sheets

| Features | Devices | | | | | |
|---|---|---|---|---|---|---|
| | D(1) Hi-Res Lo-Fps @Location X | D(2) Lo-Res Hi-Fps @Location X | D(3) PTZ Mid-Res Mid-FPS @Location X | D(4) Infra-Red Mid-Res Mid-FPS @Location X | ... | D(N) IR, PTZ Hi-Res Lo-Fps @Location Z |
| F(1) Face Recognition @Location X | 0.1 | 0.01 | 0.05 | 0.05 | ... | 0.1 |
| F(2) Object Temperature @Location X | 0.1 | 0 | 0 | 0.7 | ... | 0 |
| F(3) Car Plate @Location X | 0.3 | 0.3 | 0.5 | 0.2 | ... | 0 |
| ... | ... | ... | ... | ... | ... | ... |
| F(N) Face Recognition @Location Z | 0 | 0 | 0 | 0 | ... | 0.5 |

FIG. 8

DEVICE CONFIGURATION USING SENSITIVITY ANALYSIS

SUMMARY

Machine-learned models are a type of artificial intelligence used in the fields of video analytics, content recommendation engines, object classification, and other fields for identifying desired features within media, such as, for example, text, images, video, and audio. The accuracy of such models depends on, among other things, input data provided to the model, such as, for example, the availability, clarity, accuracy, and resolution of such data.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Figure 1:
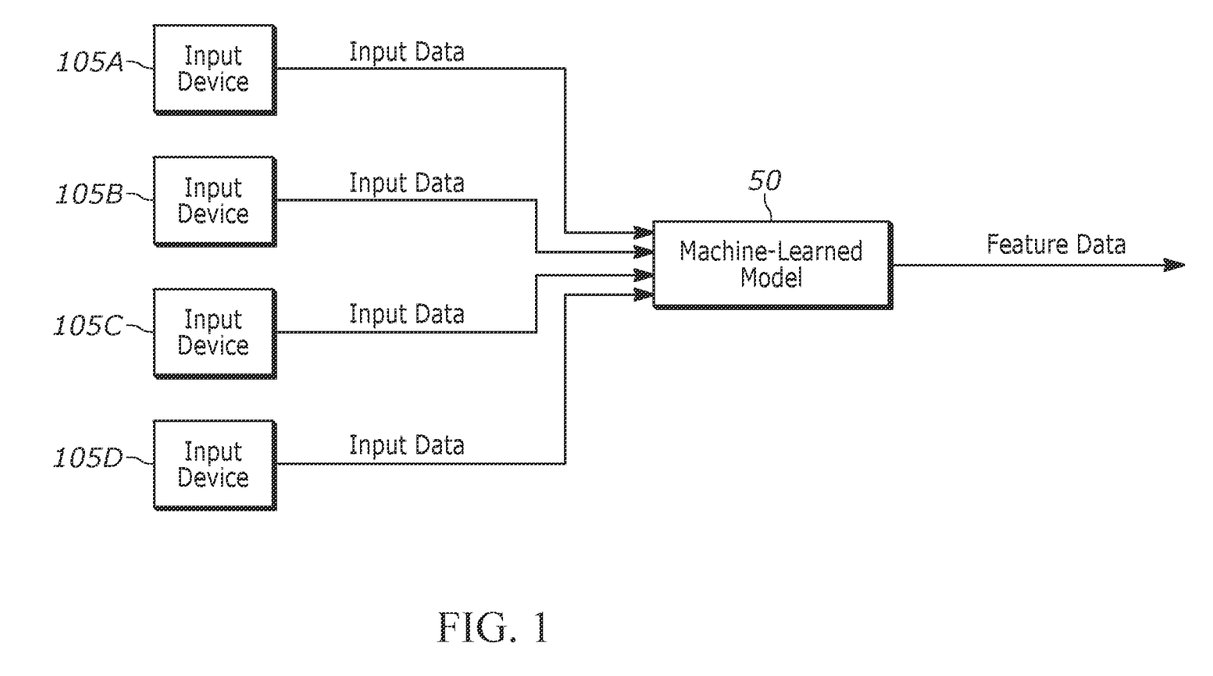
FIG. 1 schematically illustrates a machine-learned model configured to detect a plurality of features.

FIG. 1 schematically illustrates a machine-learned model 50 configured to detect a plurality of features. As described above, machine-learned models are a type of artificial intelligence used in the fields of data analytics, such as, for example, video analytics, content recommendation engines, object classification, and other fields for identifying desired features within media, such as, for example, text, images, video, and audio.

As illustrated in FIG. 1, a plurality of input device 105 provide input data to the machine-learned model 50, which the machine-learned model 50 uses to output feature data. The feature data may represent one or more features detected in the input data by the model 50, such as, for example, whether a particular object was detected in the image data and a confidence value of the detected object. The object may be a human figure, a face, a vehicle, and the like or a characteristic of such an object, such as, for example, a height of a human figure, a license plate of a vehicle, a size of a detected object, a color or other characteristic of a detected object, a quantity of detected objects, or the like. Feature data is not limited to objects detected in image data but may include, for example, speech or sounds detected in audio data.

The configuration of the input devices 105 may impact the accuracy of the models and may affect different models differently. For example, a surveillance device that captures image data at a higher frame rate than another surveillance device may provide more accurate or useful input data to the model 50. It is difficult, however, to identify what devices or types of devices should be used with a particular machine-learned model and defaulting to using the most advanced input device available with each machine-learned model adds unnecessary complexity and cost to a data analytics system. Similarly, when multiple machine-learned models are available for implementation, such as, for example, original and upgraded versions of a model, it is difficult to determine which machine-learned model to use, wherein the different models may perform differently based on available input devices.

Accordingly, as described herein, performance data is determined for each of the plurality of input devices 105 for each of a plurality of features detected via a machine-learned mode and the performance data is used, along with a ranking or scoring of feature importance, which may be determined using variability analysis, to select a device configuration for the input devices 105. The device configuration may represent a subset of the input devices 105 to use with the model 50, a change to an operating setting of one or more of the input devices 105, an upgrade, such as a firmware update, to one or more of the input devices 105, an addition of a new input device or replacement of an existing input device 105 with a new device, or a combination thereof. The device configuration may be implemented by automatically enabling or disabling one or more input devices for the model 50, changing or upgrading one or more input devices for the model 50, submitting a work order to change, upgrade, replace, or install an input device, or a combination thereof. Similarly, implementing a device configuration may include outputting a recommendation (provided on a display of a user device) regarding enabling, disabling, changing, upgrading, replacement, or installation of one or more input devices, wherein such a recommendation may be automatically performed in response to receiving approval from a user device.

One embodiment provides a device analytics system including an electronic processor. The electronic processor is configured to determine, for a machine-learned model configured to detect a plurality of features based on inputs from a plurality of devices, a prioritization ranking for a plurality of input parameters provided to the machine-learned model for each device of the plurality of devices and receive, for each device of the plurality of devices, a confidence value for each feature included in the plurality of features. The electronic processor is configured to determine, for each device included in the plurality of devices, a performance value for each feature included in the plurality of features based on the prioritization ranking for the plurality of input parameters and the confidence value for each feature for the respective device. The electronic processor is configured to select, based on the performance value for each device included in the plurality of devices for a feature included in the plurality of features, a device configuration for the machine-learned model, and implement the selected device configuration.

Another embodiment provides a method for performing device analytics. The method includes determining, for a machine-learned model configured to detect a plurality of features based on inputs from a plurality of devices, a prioritization ranking for a plurality of input parameters provided to the machine-learned model for each device of the plurality of devices, and receiving, for each device of the plurality of devices, a confidence value for each feature included in the plurality of features. The method includes determining, for each device included in the plurality of devices, a performance value for each feature included in the plurality of features based on the prioritization ranking for the plurality of input parameters and the confidence value for each feature for the respective device. The method includes selecting, based on the performance value for each device included in the plurality of devices for a feature included in the plurality of features, a device configuration for the machine-learned model, and implementing the selected device configuration.

Another embodiment provides a non-transitory computer-readable medium storing instructions that, when executed by an electronic processor, perform a set of functions. The set of functions includes determining, for a machine-learned model configured to detect a plurality of features based on inputs from a plurality of devices, a prioritization ranking for a plurality of input parameters provided to the machine-learned model for each device of the plurality of devices, and receiving, for each device of the plurality of devices, a confidence value for each feature included in the plurality of features. The set of functions includes determining, for each device included in the plurality of devices, a performance value for each feature included in the plurality of features based on the prioritization ranking for the plurality of input parameters and the confidence value for each feature for the respective device. The set of functions includes selecting, based on the performance value of each device included in the plurality of devices for a feature included in the plurality of features, a device configuration for the machine-learned model, and implementing the selected device configuration.

Figure 2:
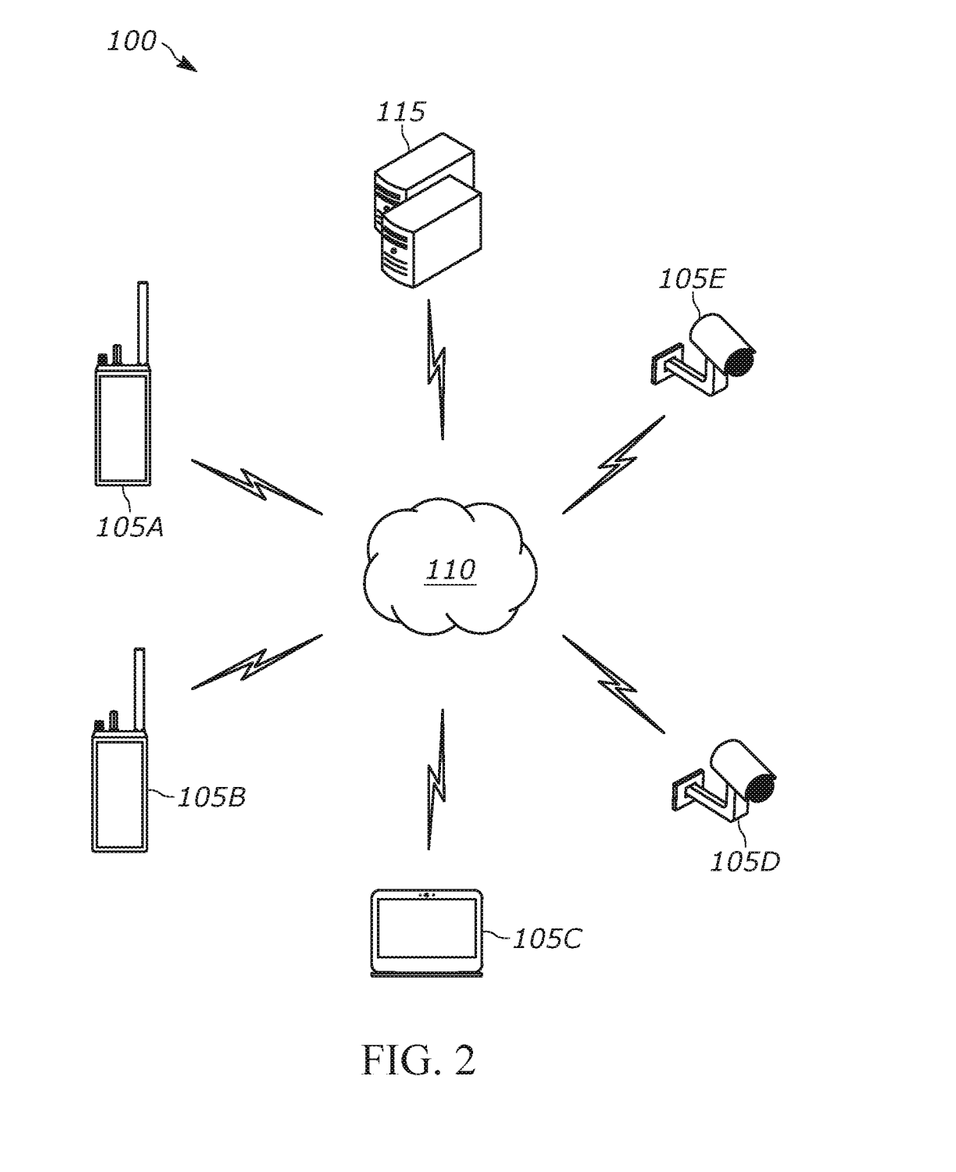
FIG. 2 is a block diagram of a device analytics system in accordance with some embodiments.

FIG. 2 is a block diagram of a device analytics system 100 according to one embodiment. In the example illustrated in FIG. 2, the device analytics system 100 includes a first input device 105A, a second input device 105B, a third input device 105C, a fourth input device 105D, and a fifth input device 105E. In the following description, when explaining how a single input device functions, a reference to input device 105 is used. It is not necessary, however, that the devices 105A through 105G be identical. For example, in FIG. 2, the first input device 105A and the second input device 105B are configured as mobile devices, such as radios, the third input device 105C is configured as a personal computing device, such as a laptop, and the fourth input device 105D and the fifth input device 105E are configured as security cameras. However, the plurality of input devices 105A through 105E are merely examples and other types of combination of device types may be included in the device analytics system 100. Also, in some embodiments, the device analytics system 100 includes more or fewer input devices than the number shown in FIG. 2.

The device analytics system 100 also includes a server 115. In some embodiments, the server 115 is a computer maintained, for example, at a call center or public safety command center. As described in more detail below, the server 115 performs devices analytics of the input devices 105 with respect to one or more machine-learned models, wherein each machine-learned model detects features based on data provided via one or more of the inputs devices 105. In some embodiments, the server 115 also stores the one or more machine-learned models.

The input devices 105A through 105E communicate with the server 115 over a network 110. The network 110 may be wired, wireless, or a combination thereof. All or parts of the network 110 may be implemented using various existing networks, for example, a cellular network, a Long Term Evolution (LTE) network, a 3GPP compliant network, a 5G network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 110 may also include future developed networks. Also, in some embodiments, the network 110 includes a combination of networks. The input devices 105A through 105E may communicate over the network 110 via one or more intermediary devices, for example, routers, gateways, firewalls, and the like. Additionally, in some embodiments, one or more of the input devices 105A through 105E communicate over different networks. For example, the first input device 105A may communicate with the server 115 over a cellular network, while the second input device 105B may communicate with the server 115 over a wireless local area network.

Figure 3:
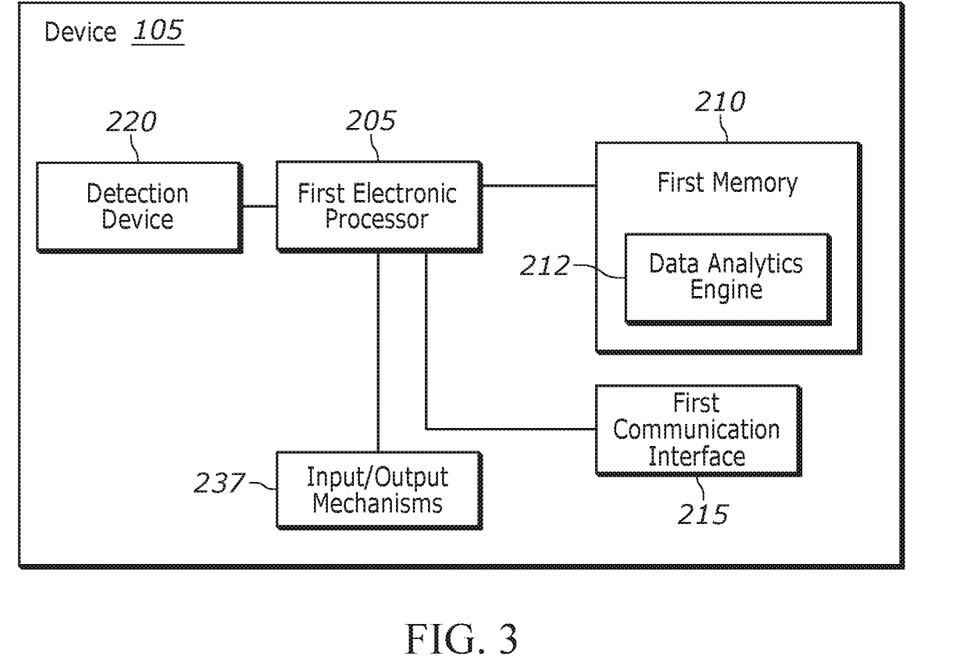
FIG. 3 is a diagram of an input device included in the device analytics system of FIG. 2 in accordance with some embodiments.

FIG. 3 is a block diagram of an input device 105 of the device analytics system 100 according to one embodiment. In the example shown, the input device 105 includes a first electronic processor 205 (for example, a microprocessor or another electronic device). The first electronic processor 205 may be electrically connected to a first memory 210, a first communication interface 215, a detection device 220, and, optionally, one or more input and output mechanisms 237. In some embodiments, the input device 105 may include fewer or additional components in configurations different from that illustrated in FIG. 3. For example, in some embodiments, the input device 105 also includes a display, one or more human-machine interfaces, a positioning receiver, (for example, a global positioning system receiver), or a combination thereof. Also, in some embodiments, the input device 105 performs additional functionality than the functionality described below.

The detection device 220 detects data in an environment around the input device 105. For example, the detection device 220 may be a camera, a microphone, or the like configured to capture audio or visual data representative of the environment around the input device 105. In some instances, the input device 105 includes multiple detection devices 220, such as having both a camera and a microphone.

The first communication interface 215 allows the input device 105 to communicate with devices, networks, or a combination thereof external to the input device 105, such as, for example, the network 110. In some embodiments, the first communication interface 215 also allows the input device 105 to communicate with one or more peripheral devices, such as, for example, a laptop, a light, a speaker, a human-machine interface, or a combination thereof.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

In some implementations, the first memory 210 stores a data analytics engine 212, which implements one or more machine-learned models to detect one or more features based on data collected via the input device 105, such as, for example, via the detection device 220 included in the input device 105. The machine-learned models implemented via the data analytics engine 212 are models trained or learned using one or more machine learning techniques. Supervised learning involves presenting example inputs and their desired outputs, wherein the model learns a general rule that maps the inputs to the outputs from the learning data it receives. Example machine learning techniques and include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms.

In some embodiments, the data analytics engine 212 includes a video analytics engine. The video analytics engine analyzes images (for example, images (video) captured by a camera of an input device 105) to, among other things, identify and detect objects within the images, for example, by implementing one or more object classifiers. Accordingly, in these embodiments, the video analytics engine receives input data from one or more input devices 105 and outputs an object classifier representing an object detected within the input data. It should be understood that the data analytics engine 212 may be stored and implemented at an input device 105, at a device external to but communicatively coupled to an input device 105, or a combination thereof. For example, in some embodiments, the input device 105 transmits (via the first communication network 215) data collected via the detection device 220 to an external device implementing the data analytics engine 212, such as, for example, the server 115 or another server or computing device. The result of the data analytics engine 212 may be provided back to the input device 105, to one or more other devices, over one or more networks, such as the network 110, or a combination thereof.

As noted above, the first network interface 215 allows the input device 105 to communicate with an external device or network, such as, for example, the network 110, other devices or networks external to the first device 105, or a combination thereof. For example, the first network interface 215 may include a transceiver for wirelessly communicating with the network 110. Alternatively or in addition, the first network interface 215 may include a connector or port to establish a wired connection to the network 110. The wired connection may be created, for example, via an Ethernet cable. As described above, the first electronic processor 205 may receive data collected via the detection device 220, such as, for example, audio data captured via a microphone, image data collected via the camera, or a combination thereof, and may communicate information related to collected data over the network 110 through the first communication interface 215. The information may be intended for receipt by another input device 105, the server 115, another device, or a combination thereof. As also noted, above, the first electronic processor 205 may output data received from the detection device 220, the network 110, or a combination thereof through the first network interface 215 to one or more peripheral devices, such as, for example, a speaker, a display, or a combination thereof included, for example, in the one or more input/output mechanisms 237. For example, a feature uncovered by a machine-learned model may be output via the first communication interface 215 over the network 110, to a speaker, a display, or the like.

Figure 4:
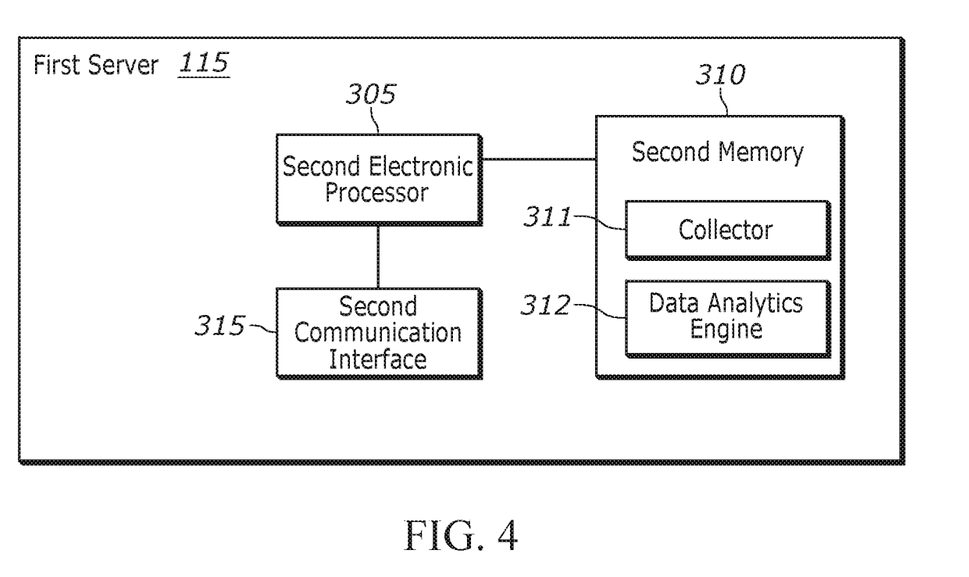
FIG. 4 is a diagram of a server included in the device analytics system of FIG. 2 in accordance with some embodiments.

FIG. 4 is a block diagram of the server 115 according to one embodiment. In the example illustrated, the server 115 is a computer that includes a second electronic processor 305, a second communication interface 315, and a second memory 310. These components are similar to those described above with respect to the input device 105 and perform similar functions but need not be identical. As noted previously herein, in some embodiments, the server 115 monitors performance data of the input devices 105, such as capabilities of the input devices 105, settings of the input devices 105, a device configuration of the input devices 105, and the like.

As illustrated in FIG. 4, in some implementations, the second memory 310 stores a collector 311 configured to perform device analytics with respect to the input devices 105, as described in more detail below. In some embodiments, the second memory 310 also stores a data analytics engine 312, configured to implement one or more of the machine-learned models as described above with respect to the data analytics engine 212. The collector 311 and the data analytics engine 212, 312 represents instructions or logic executable by a connected processing device (such as the first electronic processor 205) to perform the functionality and methods described herein.

In some embodiments, at least some of the information described above as being stored by the second memory 310 may be stored in a database or other network element that is separate from the server 115. In such embodiments, the separate database communicates with the server 115 over the network 110 such that the server 115 receives information stored in the separate database.

As previously described, the data analytics engines 212, 312 implement one or more machine-learned models trained to recognize features within input data, such as, for example, objects, words, voices, events, or the like. Features are typically expressed alongside a confidence level, or a percentage or value indicating a confidence that the output feature is accurate. When the data analytics engine 212 has complete confidence of 1.0, the data analytics engine 212, 312 has full confidence in the detected feature. Should the data analytics engine 212, 312 fail to detect a particular feature within input data, the data analytics engine 212, 312 may output a "None" (NaN) value.

The confidence level of detected features may be dependent on characteristics of the input device 105 inputting data to the data analytics engine 212, 312 which is used as input to the one or more machine-learned models. For example, the framerate of video recorded by a camera included in an input device 105 may vary based on make or model (for example, a device type) of the respective input device 105. Similarly, when a plurality of input devices 105 are associated with a common location or area, the distance or perspective may be different for each device 105 when capturing image or video with the camera. Accordingly, various capabilities and settings of the input devices 105 impact the confidence level of detected features, which impact the performance a machine-learned model receiving data from the input devices.

Embodiments described herein select and implement a device configuration of the plurality of input devices 105 providing data to a machine-learned model implemented via a data analytics engine 212, 312 to improve an output (performance) of the machine-learned model. Device configurations include, for example, selecting a particular input device 105 to detect a feature at a location, recruiting a nearby input device 105 to detect a feature at a location, adjusting the settings or operating parameters of an input device 105, such as, for example, field-of-view, framerate, resolution, or the like, as well as additional device configurations described herein.

Figure 5:
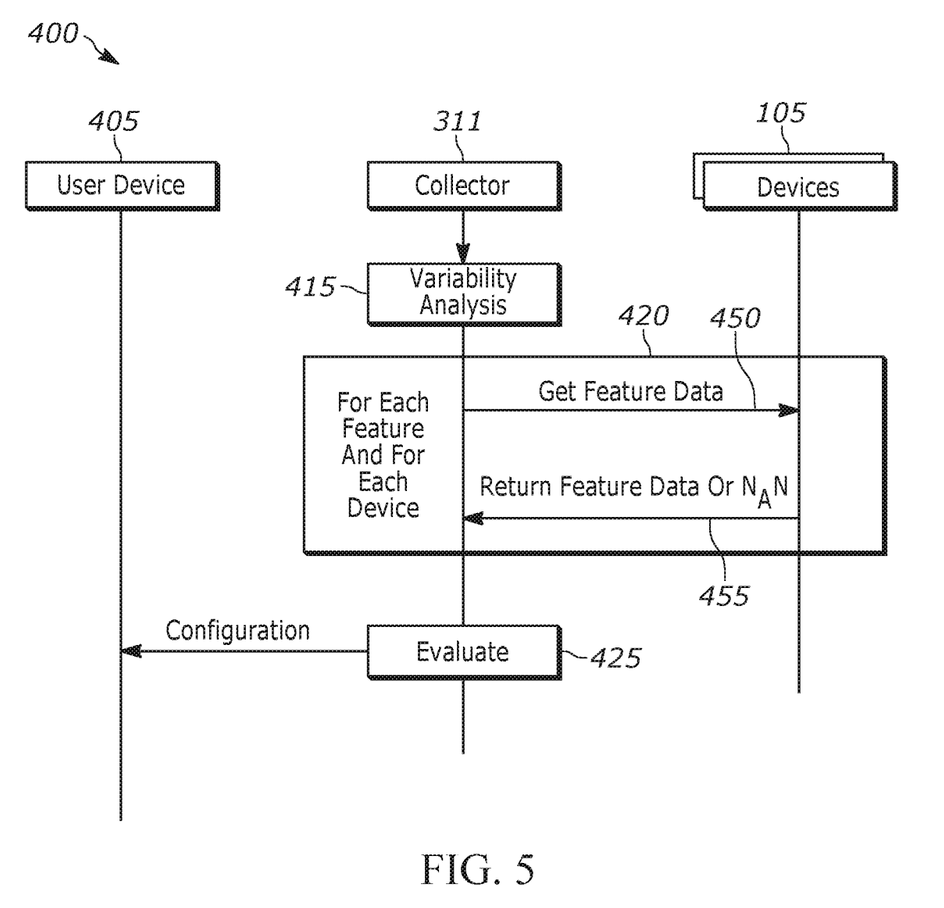
FIG. 5 is a sequence diagram illustrating functionality provided via the device analytics of FIG. 2 in accordance with some embodiments.

For example, FIG. 5 is a sequence diagram 400 illustrating functionality provided via the device analytics system 100 according to some embodiments. As illustrated in FIG. 5, the collector 311 (executed by the second electronic processor 305 of the server 115) performs a variability analysis (at 415).

The variability analysis applies noise into test data provided to a machine-learned model to determine the impact of the noise on output of the machine-learned model. For example, a typical machine-learned model includes many input parameters to determine a single feature or provide a single output. Input parameters may include, for example, a facial recognition parameter to identify a particular person, or a car plate detection parameter to identify a particular license plate number. Input parameters may, in fact, be features detected by a machine-learned model. However, the input parameters are model outputs of a different "level" than detected features. As one example, the variability analysis determines that a facial recognition algorithm has the greatest impact on the output of a machine-learned model for identifying a specific person in an image. The feature data received from each device 105 (described below) is the result of the device 105 for identifying the specific person. However, some input parameters impact the overall output of the machine-learned model significantly more than others. The variability analysis is performed at specific data points, which may be related to test data or a validation set most representative for a particular analytic operation. Accordingly, the variability analysis can be used to determine a set of parameters that most "greatly" impact the output of the machine-learned model. For example, one or more thresholds may be implemented. When a confidence of the machine-learned model exceeds the threshold for the given parameter, the input parameter is added to the set of parameters. In some instances, noise is added to test data supplied to the machine-learned model for the variability analysis operation. Examples of applying noise include reducing the resolution of test image or video data, changing colors of test image or video data, adding static to test audio data, and the like.

In some instances, the variability analysis provides a value indicating an importance of each input parameter (for example, a prioritization ranking) detected via the machine-learned model for each input device 105. For example, the importance may be a normalized importance ranging from a value of zero to one. A normalized importance value of one indicates that the associated input parameter is the sole factor implying the result of the prediction and other input parameters can be excluded from the analysis for the respective input device 105. Alternatively, a normalized importance value of zero indicates that the associated input parameter has no factor in the result of the prediction and can be excluded from the analysis. For example, an object temperature detection parameter may have little impact on identifying a particular license plate number. Accordingly, the collector 311 may disregard input parameters having a normalized importance value of zero.

At 420, the collector 311 communicates with the plurality of input devices 105 to determine performance data of each input device. Specifically, in the example of FIG. 5, at 450, the collector 311 requests feature data from each input device 105. Feature data for each input device may include each feature detectable the input device 105 and the respective confidence values. At 455, the collector 311 receives the feature data from each device 105. In situations where a device 105 cannot detect a given feature, the device 105 may return a "None" or NaN value. In some instances, the confidence values are normalized confidence ranging from a value of zero to one. A normalized confidence value of one indicates that the result of the prediction is unambiguous. A normalized confidence value of zero indicates that the machine-learned algorithm detects no indication of the respective feature. In some embodiments, when a known or real value of an object captured by the input device is known, the collector 311 may calculate a confidence value based on a difference between the device provided feature and the known feature. The collector 311 may perform this calculation when a confidence value is not provided for feature data or when a confidence value is provided, such as, for example, as a check on the provided confidence value.

At 425, the collector 311 evaluates the performance of each of the plurality of input devices 105 for each feature. For example, the collector 311 may account for both the importance of each input parameter (as determined via the variability analysis) and the confidence level of each feature for each input device. In some embodiments, the collector 311 multiplies the normalized importance of each input parameter by the normalized confidence level for each feature and for each input device 105 to evaluate a normalized performance of each device 105. After the performance of each input device for each feature is evaluated, the collector 311 determines a device configuration and implements the device configuration, such as, for example, by presenting a device configuration recommendation to the user device 405, described below in more detail (with respect to FIG. 7).

Figure 6:
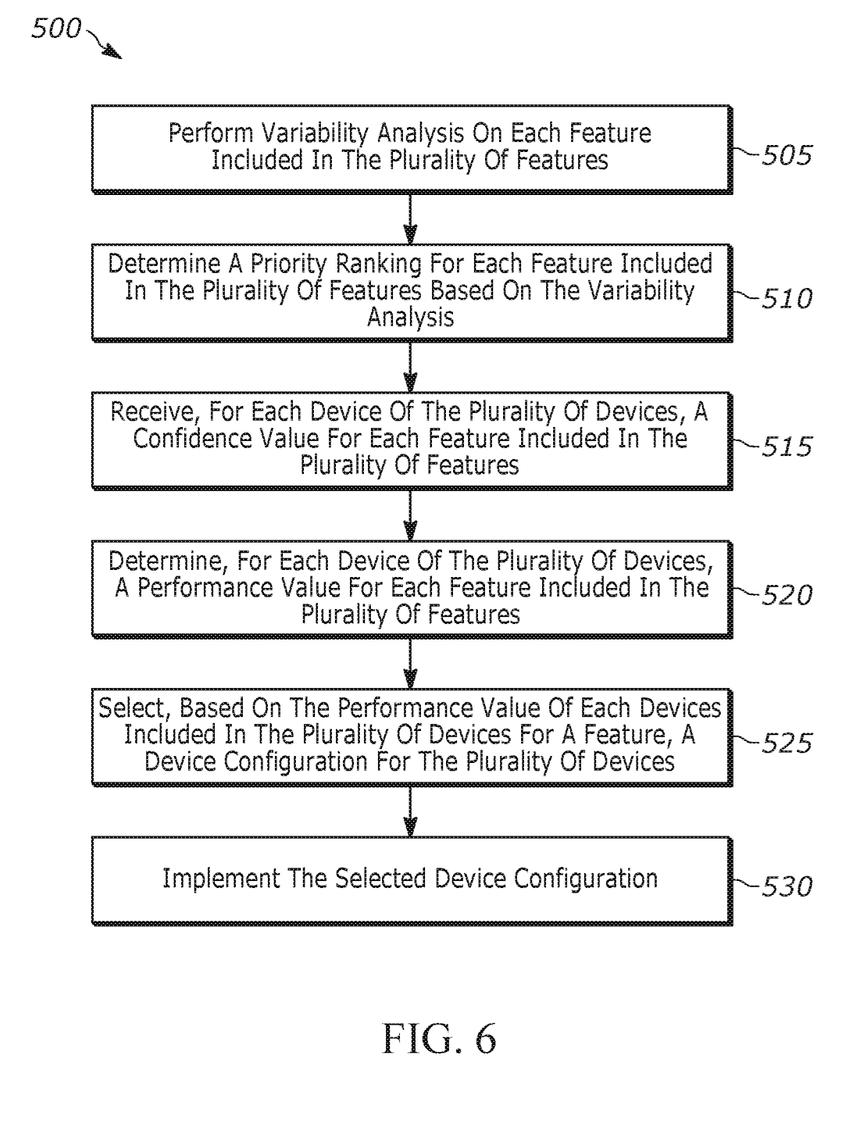
FIG. 6 is a flowchart of a device analytics method performed via the device analytics system of FIG. 2 in accordance with some embodiments.

When a machine-learned model needs to detect a particular feature, the collector 311 may reconfigure a device configuration of the plurality of input devices 105 to ensure that the best-equipped device 105 is used to perform said feature. FIG. 6 illustrates one example method 500 for selecting a device configuration for the plurality of input devices 105. The method 500 is described as being executed by the second electronic processor 305 (for example, the server 115 functioning as the collector 311). However, in some examples, aspects of the method 500 are performed by another device. For example, the method 500 may be performed by a first electronic processor 205 of a device 105 or may be performed by a first electronic processor 205 of a device 105 in conjunction with the second electronic processor 305 of the server 115.

At block 505, the second electronic processor 305 performs a variability analysis on each input parameter included in a plurality of input parameters provided to a machine-learned model. For example, as described above, to perform the variability analysis, the second electronic processor 305 provides noise to each input of the machine-learned model to receive a set of input parameters that impact the ability of the machine-learned model to detect a given feature. At block 510, the second electronic processor 305 determines a priority ranking for each input parameter included in the plurality of input parameters based on the variability analysis. The second electronic processor 305 determines the normalized importance of each parameter included in the set of input parameters, as previously described.

At block 515, the second electronic processor 305 receives, for each device 105 of the plurality of devices 105, a confidence level for each feature included in the plurality of features. For example, the second electronic processor 305 receives the normalized confidence value of each feature from each device 105 when each device 105 attempts to initially identify the desired feature. At block 520, the second electronic processor 305 determines, for each input device 105 of the plurality of input devices 105, a performance value for each feature included in the plurality of features. For example, in some embodiments, the second electronic processor 305 multiplies the normalized importance of each input parameter in the set of parameters for each device 105 by the normalized confidence level for each feature and for each device 105 to evaluate a normalized performance of each device 105.

At block 525, the second electronic processor 305 selects, based on the performance value of each device 105 included in the plurality of devices 105 for a feature, a device configuration for the plurality of devices 105. At block 530, the second electronic processor 305 implements the selected device configuration. Example device configurations are provided below with respect to FIG. 7.

Figure 7:
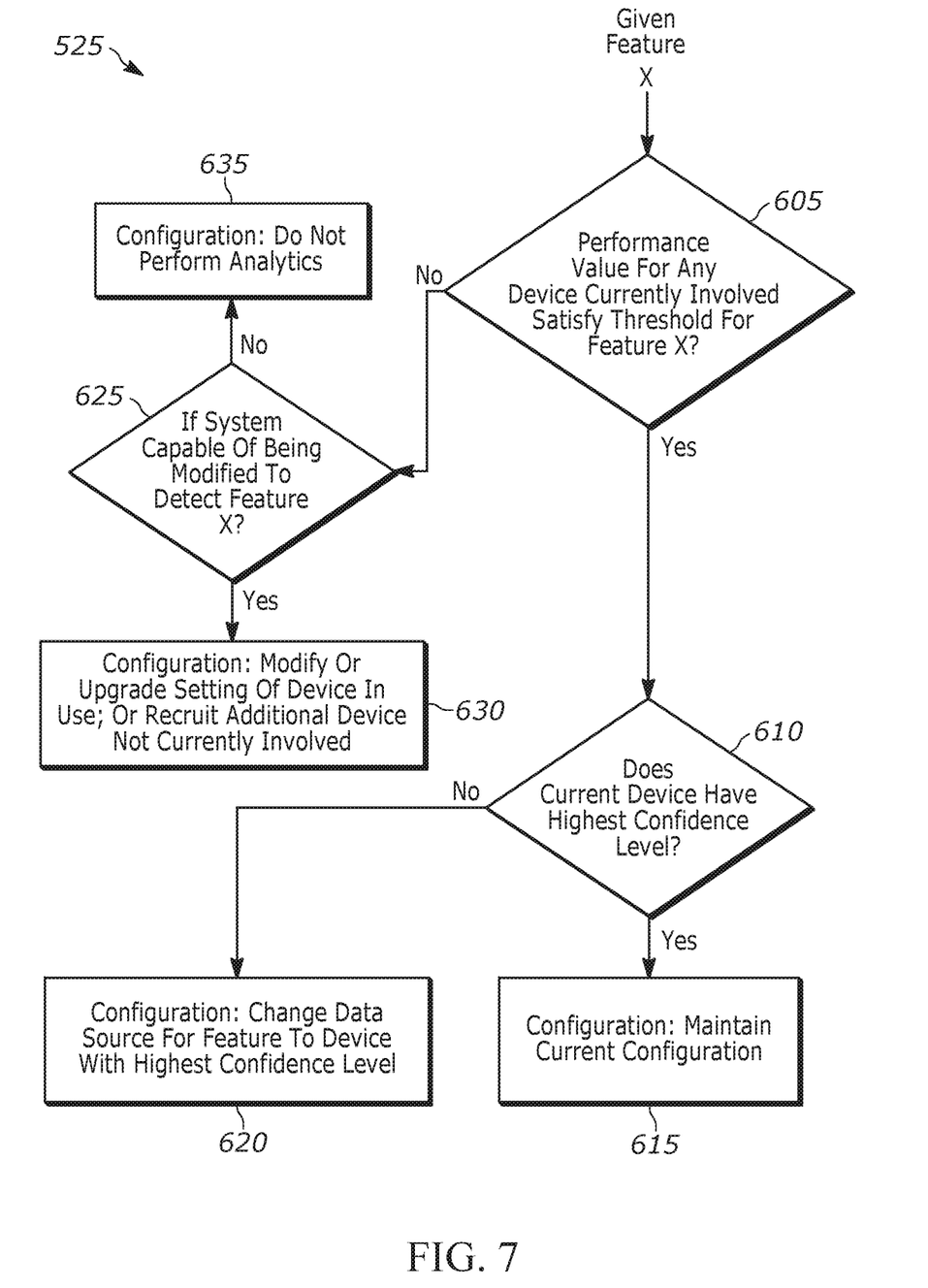
FIG. 7 is a flowchart of a method for selecting a device configuration performed via the device analytics system of FIG. 2 as part of the data analytics method of FIG. 6 in accordance with some embodiments.

To select a device configuration (at block 525), the second electronic processor 305 refers to the performance value for each device and the confidence level of each device in detecting the desired feature. FIG. 7 illustrates an example process performed at block 525 for selecting a device configuration for the plurality of devices 105. The process 525 is described as being executed by the second electronic processor 305 (for example, the server 115 functioning as the collector 311). However, in some examples, aspects of the process 525 are performed by another device. For example, the process 525 may be performed by a first electronic processor 205 of a device 105 or may be performed by a first electronic processor 205 of a device 105 in conjunction with the second electronic processor 305 of the server 115. In the process 525, the second electronic processor 305 is determining a device configuration to detect an example Feature X.

At decision block 605, the second electronic processor 305 determines whether the performance value for any device 105 currently involved in an analytics process satisfies a performance threshold for the Feature X. For example, the second electronic processor 305 determines whether the performance value for any device 105 currently involved in the process to detect Feature X has a performance value for Feature X greater than or equal to a performance threshold.

When the performance value for the Feature X does satisfy the performance threshold for any device 105 ("YES" at decision block 605), the second electronic processor 305 proceeds to decision block 610. At decision block 610, the second electronic processor 305 determines whether the current device detecting Feature X has the highest confidence value. As one example, in a setting, the second device 105B was selected to detect Feature X. However, in the new setting, additional devices 105 are available to detect Feature X. Accordingly, the second electronic processor 305 selects the device 105 with the highest confidence value for the Feature X. When the second electronic processor 305 determines that the current device detecting Feature X has the highest confidence value ("YES" at decision block 610), the second electronic processor 305 proceeds to block 615 and selects to maintain the current device configuration.

When the second electronic processor 305 determines that the current device detecting Feature X does not have the highest confidence value ("NO" at decision block 610), the second electronic processor 305 proceeds to block 620 and selects to change the data source for detecting feature X to the device 105 with the greatest confidence value for Feature X. For example, when the fourth device 105D has the greatest confidence value for detecting Feature X compared to each device 105A-105E, the second electronic processor 305 selects the fourth device 105D to detect Feature X.

Returning to decision block 605, when the second electronic processor 305 determines that the performance value for the Feature X does not satisfy the performance threshold for any device 105 ("NO" at decision block 605), the second electronic processor 305 proceeds to decision block 625. At decision block 625, the second electronic processor 305 determines whether the communication system 100 is capable of being modified to detect feature X. For example, the second electronic processor 305 may detect a nearby device not currently involved in detecting the Feature X but is capable of detecting Feature X. In such an instance, the second electronic processor 305 may "recruit" the new device to detect Feature X. In another example, the second electronic processor 305 determines that a software update is available for one or more of the devices 105. The software update may update settings of the device 105, may update the AI application 212, 312 to a newer firmware version or model with higher capabilities, may adjust an operating parameter of a device 105, or the like. When the second electronic processor 305 determines that the communication system 100 is capable of being modified to detect feature X ("YES" at decision block 625), the second electronic processor 305 proceeds to modify the communication system 100. When the second electronic processor 305 determines that the communication system 100 is not capable of being modified ("NO" at decision block 625), the second electronic processor 305 determines not to perform analytics to detect Feature X.

IMPLEMENTATION EXAMPLES AND USE CASES

Example 1

Figure 8:
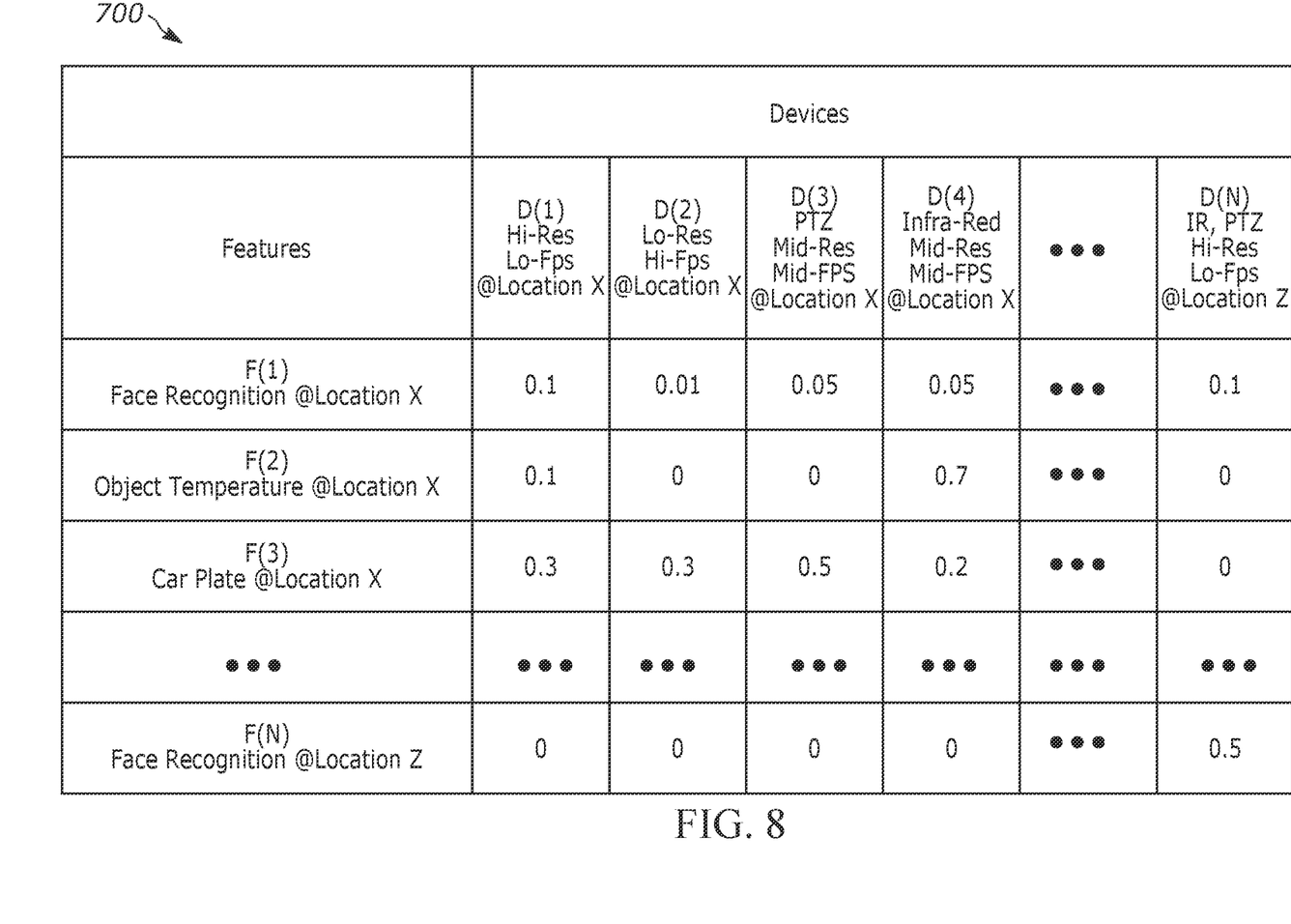
FIG. 8 is a table illustrating example performance values of input devices included in the device analytics system of FIG. 2.

In some implementations, by determining the relative importance of features, the communication system 100 prioritizes devices 105 that can be upgraded to support changes within a monitored environment. For example, FIG. 8 illustrates a table 700 providing a plurality of devices D(1) through D(N) for detecting a plurality of features F(1) through F(N). Each of the devices D(1) through D(N) have characteristics such as a image resolution (ranging from low-resolution to high-resolution), a framerate (or frames per second [FPS]) for recorded video (ranging from low-FPS to high FPS), a location of the device (for example, location X, location Y, location Z), and additional capabilities of the device (such as, for example, infra-red capabilities, pan-tilt-zoom [PTZ] capabilities, time of flight [ToF] capabilities, and the like). Each feature F(1) through F(N) is a particular feature detectable by the devices D(1) through D(N). For example, F(1) is a facial recognition feature at location X, F(2) is an object temperature feature at location X, F(3) is a car plate detection at location X, and the like.

As one example, on the Fourth of July, a heavy amount of pedestrian traffic is expected at location X. Accordingly, a device within the communication system 100 acting as the collector 311 determines that facial recognition capabilities at location X should be the prioritized feature. The collector 311 may determine that the required performance value for detecting the feature F(1) is 0.05. In some instances, the collector 311 selects the device D(1) to perform the facial recognition analytics, as D(1) has the highest performance value of 0.1. In other instances, the collector 311 upgrades the device D(2), or otherwise modifies settings of the device D(2), to increase the performance value of the device D(2) to a value of at least 0.05 such that each device at the location X is capable of facial recognition analytics.

Example 2

In another example, the AI application 212, 312 is used to translate Sign Language from captured video. In such an implementation, the AI application 212, 312 may capture the video stream alongside time-of-flight (ToF) readouts. Accordingly, a device capable of both video capture and ToF is desired.

When interrogating a witness that uses Sign Language, a Police Officer A selects a video analytics and requests a collector 311 (for example, a device associated with the Police Officer A) to perform a variability analysis for the specified video analytics. The collector 311 performs the variability analysis on the selected video analytics and determines that hand to head distance is an important feature that defines some gestures. Hand to head distance is properly captured by a ToF camera and the head of a person performing the Sign Language must be visible. Additionally, the collector determines, based on the variability analysis, that the distance between each finger is an important feature that defines some gestures. Accordingly, the distance between each finger should be captured by a camera in front of the person performing the Sign Language.

The collector 311, after checking the capabilities of the device associated with the Police Officer A, determines that the device associated with the Police Officer A should not be used as it lacks a ToF camera. However, the collector 311 identifies that a device associated with nearby Police Officer B does include a ToF camera. Accordingly, the collector 311 recruits the device associated with Police Officer B for the task of measuring the hand to head distance. The collector 311 then displays, on the device associated with the Police Officer A, that the device associated with the Police Officer B is being recruited to assist with the video analytics. Additionally, the collector 311 displays that the device associated with the Police Officer A should be placed in front of the witness to capture the distance between each finger. The device of Police Officer B is used to capture the head to hand distance using its ToF camera, while the device of Police Officer A, while situated in front of the witness, is used to capture the distance between each finger. Accordingly, both important features are accurately captured, and devices are selected to provide input to the video analytics based on their capabilities.

Example 3

In yet another example, an Operator C operates a system with a video analytics application enabled on several cameras. The video analytics application is used to prevent security threats related to field-of-view (FoV) persona behavior. The Operator C runs a "sanity check" software which performs the method 500 on the existing video analytics application. The variability analysis discovers that the detection of visitor bags, an important feature, is not being captured correctly.

In response, the Operator C (or the device that ran the variability analysis) upgrades the video analytics software to a newer version different from baseline software. In the newer version, important features have been slightly modified due to a larger training set. Accordingly, the operation of the video analytics software is changed from previous configurations. In this newer version, the feature of detecting visitor bags was extended as a new training set. Accordingly, by upgrading the video analytics application, the system is capable of detecting an important feature.

Example 4

In a further example, an Operator D operates a system with a video analytics application enabled on several cameras. The video analytics system is used to analyze the contents of luggage. However, the Operator D determines that the video analytics system is incapable of detecting whether any liquid bottles are present.

The Operator D initiates a variability analysis on several potential new video analytics models, using the cameras within the system as inputs to the variability analysis. Using the results of the variability analysis, a new video analytics model is selected that can detect liquid bottles within luggage, a feature previously not available for detection. The variability analysis and performance analysis ensures that the best model given the current set and configuration of devices is selected. For example, one available model may require data at a resolution none of the current devices are capable of providing. Accordingly, selecting this model may actually degrade the overall performance of the video analytics system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, it should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A device analytics system, the system comprising:
    an electronic processor configured to:
        determine, for a machine-learned model configured to detect a plurality of features based on inputs from a plurality of devices, a prioritization ranking for a plurality of input parameters provided to the machine-learned model for each device of the plurality of devices,
        receive, for each device of the plurality of devices, a confidence value for each feature included in the plurality of features,
        determine, for each device included in the plurality of devices, a performance value for each feature included in the plurality of features based on the prioritization ranking for the plurality of input parameters and the confidence value for each feature for the respective device,
        select, based on the performance value of each device included in the plurality of devices for a feature included in the plurality of features, a device configuration for the machine-learned model, and
        implement the selected device configuration.

2. The system of claim 1, wherein the electronic processor is configured to implement the selected device configuration by upgrading firmware of at least one device of the plurality of devices.

3. The system of claim 1, wherein the electronic processor is configured to implement the selected device configuration by adjusting at least one operating parameter of at least one device of the plurality of devices.

4. The system of claim 1, wherein the electronic processor is configured to implement the selected device configuration by selecting a device from the plurality of devices to provide input to the machine-learned model.

5. The system of claim 4, wherein the electronic processor is configured to select the device to provide input to the machine-learned model based on a capability of the device.

6. The system of claim 1, wherein the electronic processor is configured to implement the selected device configuration by identifying a new device to include in the plurality of devices.

7. The system of claim 1, wherein the prioritization ranking is determined by performing a variability analysis.

8. The system of claim 7, wherein the variability analysis is performed on test data and wherein, prior to performing the variability analysis, noise is added to the test data.

9. The system of claim 1, wherein the prioritization ranking for each feature is normalized between zero and one, and wherein the electronic processor is further configured to:
    disregard each feature of the plurality of features having a normalization of zero.

10. The system of claim 9, wherein the confidence value for each feature is normalized between zero and one, and wherein the electronic processor is further configured to:
    determine the performance value for each device by multiplying the prioritization ranking for each feature with the confidence value for each feature.

11. A method for performing device analytics, the method comprising:

determining, for a machine-learned model configured to detect a plurality of features based on inputs from a plurality of devices, a prioritization ranking for a plurality of input parameters provided to the machine-learned model for each device of the plurality of devices,     receiving, for each device of the plurality of devices, a confidence value for each feature included in the plurality of features,     determining, for each device included in the plurality of devices, a performance value for each feature included in the plurality of features based on the prioritization ranking for the plurality of input parameters and the confidence value for each feature for the respective device,     selecting, based on the performance value of each device included in the plurality of devices for a feature included in the plurality of features, a device configuration for the machine-learned model, and     implementing the selected device configuration.

12. The method of claim 11, wherein implementing the selected device configuration includes upgrading firmware of at least one device of the plurality of devices.

13. The method of claim 11, wherein implementing the selected device configuration includes adjusting at least one operating parameter of at least one device of the plurality of devices.

14. The method of claim 11, wherein implementing the selected device configuration includes selecting a device from the plurality of devices to provide input to the machine-learned model.

15. The method of claim 14, wherein selecting the device from the plurality of devices includes selecting the device from the plurality of devices based on a capability of the device.

16. The method of claim 11, wherein implementing the selected device configuration includes identifying a new device to include in the plurality of devices.

17. The method of claim 11, wherein determining the priority ranking includes performing a variability analysis.

18. Non-transitory computer-readable medium storing instructions that, when executed by an electronic processor, perform a set of functions, the set of functions comprising:

determining, for a machine-learned model configured to detect a plurality of features based on inputs from a plurality of devices, a prioritization ranking for a plurality of input parameters provided to the machine-learned model for each device of the plurality of devices,     receiving, for each device of the plurality of devices, a confidence value for each feature included in the plurality of features,     determining, for each device included in the plurality of devices, a performance value for each feature included in the plurality of features based on the prioritization ranking for the plurality of input parameters and the confidence value for each feature for the respective device,     selecting, based on the performance value of each device included in the plurality of devices for a feature included in the plurality of features, a device configuration for the machine-learned model, and     implementing the selected device configuration.

19. The non-transitory computer-readable medium of claim 18, wherein implementing the selected device configuration includes selecting a device from the plurality of devices to provide input to the machine-learned model.

20. The non-transitory computer-readable medium of claim 19, wherein selecting the device from the plurality of devices includes selecting the device from the plurality of devices based on a capability of the device.

\* \* \* \* \*